H. J. AHOLA.
AUTOMATIC WATER DISCHARGE TRAP FOR GAS MAINS.
APPLICATION FILED NOV. 2, 1914.
1,183,513.
Patented May 16, 1916.
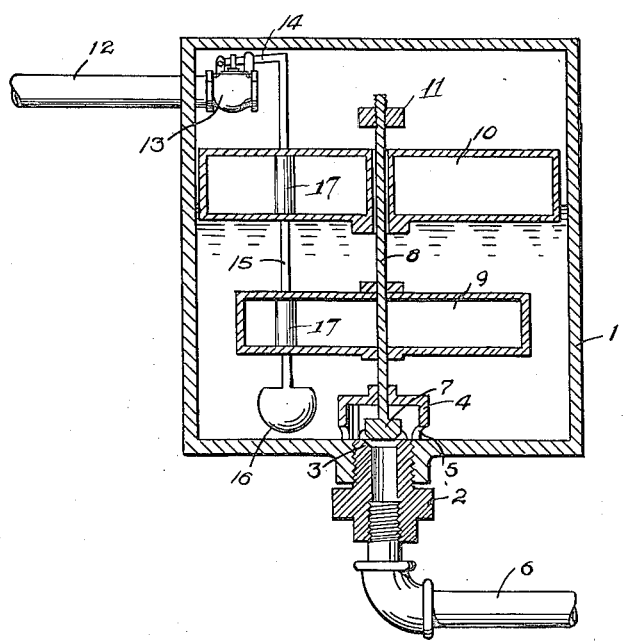

UNITED STATES PATENT OFFICE.

HENRY J. AHOLA, OF WEST DULUTH, MINNESOTA.

AUTOMATIC WATER-DISCHARGE TRAP FOR GAS-MAINS.

1,183,513.  Specification of Letters Patent.  Patented May 16, 1916.

Application filed November 2, 1914. Serial No. 869,814.

*To all whom it may concern:*

Be it known that I, HENRY J. AHOLA, a subject of the Czar of Russia, residing at West Duluth, in the county of St. Louis and State of Minnesota, have invented certain new and useful Improvements in Automatic Water-Discharge Traps for Gas-Mains, of which the following is a specification, reference being had therein to the accompanying drawing.

My invention relates to improvements in automatic water discharge traps for gas mains, the primary object of which is to produce a simple and inexpensive device which will automatically separate the water from the gas and discharge the separated water from the separating device.

The accompanying drawing shows a vertical section through my improved discharge trap, showing the pipe connections thereto in perspective.

Referring now to the drawings in which like reference numerals designate similar parts, 1 represents a completely inclosed tank preferably of metal construction and rectangular in shape. Within the center of the bottom of the tank 1 is inserted a hollow plug 2, the inner end of which is shaped to form a valve seat 3 which seat is made flush with the inner face of the bottom of the tank. A suitable housing 4 is provided for the valve seat 3 and is carried by the bottom of the tank 1. This housing 4 is provided with a plurality of limber openings 5 in its abutting edge with the bottom of the tank which serve to allow the liquid from the interior of the tank passing therefrom into a discharge pipe 6, from where it may be discharged into a suitable waste pipe or sewer as desired.

Coöperating with the valve seat 3, is a valve 7 vertically reciprocally mounted above the seat. This valve 7 is provided with a vertically extending stem 8 which passes through and has a bearing in the upper end wall of the housing 4. This stem extends upwardly to a point approximately near the upper end of the tank 1. Around the stem 8 and rigidly fixed thereto adjacent the housing 4, is a float 9 which is preferably of a rectangular elongated form in cross section, the outermost walls of which are made to nearly coincide with the boundary walls of the tank 1. A similarly shaped float 10 also surrounds the valve stem 8 and is loosely mounted thereupon. This float 10 is designed to rest upon the float 9 when it is not buoyed upwardly by the action of the liquid accumulated within the tank 1. This float 10 has lateral dimensions practically equal to those of the inside of the tank 1 so that any lateral movement thereof will not materially affect the valve stem 8 to cause any disarrangement thereof. This float remains free to be raised or lowered a limited distance by the action of the liquid within the tank without affecting the valve stem 8.

The upward limitation of the float 10 is adjustably governed by means of a nut 11 screw-threaded upon the uppermost end of the valve stem 8. The lowermost vertical limitation of the float 10 is governed by the valve stem 8, and the float 9 upon which the float 10 will rest at such times as when the liquid in the tank is not sufficiently high to lift the float 10.

An intake pipe 12 has communication with the tank 1 at a level slightly above the float 10 when the said float is in its uppermost position. While only one intake pipe is shown, a gas discharge pipe might also be connected to the tank about the high-water line and in this case the tank 1 would be installed within the pipe-line. However, it is here shown as being at the terminus of the pipe-line and it is evident that the pipe 12 may lead from the main line of pipe at any desired point where water is wont to collect.

The operation of my device is as follows: Gas is admitted into the tank 1 through the intake pipe 12 and there the water condenses from the gas and falls into the bottom of the tank 1. The valve 7 is normally held seated in its seat 3 through the weight of the valve, stem and floats 9 and 10. As the level of water rises in the tank, it will gradually surround and submerge the float 9, for the reason that this float has not sufficient buoyancy to overcome the combined weight of the water now upon the valve and that of the stem and the other float 10. As the water continues to rise above the uppermost surface of the float 9, the float 10 will be buoyed upwardly sliding freely upon the valve stem 8. This float 10 will be raised until its upper face comes in contact with the nut 11 when it will raise the float 9 and valve stem 8 and unseat the valve 7. This valve being unseated, the liquid will pass from the tank through the limber openings 5 and be passed off through the discharge pipe 6. The liquid within the tank will continue to be discharged until the water has been lowered sufficiently to allow the float 10 to resume its position upon the float 9 where its added weight will, as the water continues to lower, again close the valve 7 and thus stop the discharge of water from the tank.

It is quite evident that as the tank fills again with water, the valve 7 will remain closed until such time as the float 10 will rise and engage the nut or stop 11 which will then release the valve as before described. Thus the volume of water intermittently contained and discharged by the tank is governed by the reciprocal float 10 and the limit of the vertical movement of the float may be made to suit the circumstances. Thus the present improvement is a practical automatic discharge trap for gas mains which will effectually care for the collection of water within the mains.

As a precaution against the failure of the valve 7 to operate properly at any time and thus permit of all the water in the tank 1 leaving the same and also allowing the gas from the intake 12 to discharge through the pipe 6, we have provided a safety lever valve 13, such as is in common use, the lever 14 of which has rigidly suspended therefrom the arm 15 vertically within the tank 1 and which has attached at its lower extremity the float 16. This float 16 is so located as to be just below the lowest point reached by the float 9.

It is apparent from the above that should the valve 7 fail at any time in its proper operation in such a manner as to allow all of the water in the tank 1 to discharge through the pipe 6, there will, likewise, be a discharge of gas directly from the intake 12 to the discharge pipe 6, which would be a dangerous condition as well as a waste of gas. However, as above described, we have supplied the safety lever valve 13, whose lever 14 is operated by means of the float 16 and the connecting rod 15.

It will be apparent that while there is a constant amount of water in the tank 1, there will be a continuous upward pressure upon the float 16, it being submerged to a point lower than the lowest sinking point of float 9. This pressure will tend to keep the valve 13 open under all normal conditions. However, should the water, through some failure of the valve 7, entirely escape from the tank 1, the float 16 will descend with same by gravity, thus closing the valve 13 and preventing a further flow of gas into the tank.

Vertical conduits or tubes 17 are formed in the floats 9 and 10 through which the rod 15 may freely reciprocate without affecting the floats or the latter affecting the rod.

Having thus fully described my invention what I claim and desire to secure by Letters Patent is:

The combination with a tank having an inlet, an outlet, two thin flat automatically coöperative floats for controlling the outlet, and a third float for controlling the inlet, of means whereby the stem of the latter float passes through the former floats and acts as a guide thereto.

In testimony whereof I hereunto affix my signature in the presence of two witnesses.

HENRY J. AHOLA.

Witnesses:
W. H. DENHAM,
S. GEO. STEVENS.